(12) United States Patent
Orr et al.

(10) Patent No.: US 12,071,235 B2
(45) Date of Patent: Aug. 27, 2024

(54) FUEL TANK ACCESS PANEL HEAT EXCHANGER

(71) Applicant: The Boeing Company, Chicago, IL (US)

(72) Inventors: Matthew W. Orr, Kirkland, WA (US); Philip A. Van Seeters, Everett, WA (US); Christopher B. Pastega, Woodway, WA (US)

(73) Assignee: The Boeing Company, Chicago, IL (US)

( * ) Notice: Subject to any disclaimer, the term of this patent is extended or adjusted under 35 U.S.C. 154(b) by 75 days.

(21) Appl. No.: 17/383,757

(22) Filed: Jul. 23, 2021

(65) Prior Publication Data

US 2023/0027644 A1  Jan. 26, 2023

(51) Int. Cl.
*B64C 3/34* (2006.01)
*B64D 37/04* (2006.01)
*B64D 37/34* (2006.01)

(52) U.S. Cl.
CPC ............... *B64C 3/34* (2013.01); *B64D 37/04* (2013.01); *B64D 37/34* (2013.01)

(58) Field of Classification Search
CPC ...... B64D 37/005; B64D 37/32; B64D 37/34; B64D 37/04–06
See application file for complete search history.

(56) References Cited

U.S. PATENT DOCUMENTS

| | | | |
|---|---|---|---|
| 2016/0001871 A1* | 1/2016 | Martin | B64D 37/32 244/129.5 |
| 2019/0136109 A1* | 5/2019 | Agapov | C08K 3/36 |
| 2020/0047908 A1* | 2/2020 | Filipenko | H02K 9/197 |
| 2021/0237847 A1* | 8/2021 | Tanner | B64F 5/10 |

* cited by examiner

*Primary Examiner* — Philip J Bonzell
*Assistant Examiner* — Ashesh Dangol
(74) *Attorney, Agent, or Firm* — Felix L. Fischer

(57) ABSTRACT

An access panel to be received in an access aperture in a lower skin of a wing on an aircraft incorporates a body surrounded by a sealing flange. The body is configured to be received in the access aperture and the sealing flange is configured to be received on a sealing land surrounding the access aperture. An integral heat exchanger extends from a top surface of the body into a fuel tank in the wing to conduct heat from the fuel to an external surface of the access panel.

19 Claims, 17 Drawing Sheets

FUEL TANK ACCESS PANEL HEAT EXCHANGER

BACKGROUND INFORMATION

Field

This disclosure relates generally to the field of aircraft thermal control systems and, more particularly, to an integrated heat exchanger for fuel cooling.

Background

Commercial aircraft are quite complex and can be large with significant mass present in various systems. Fuel carried by the aircraft is often used as a circulating heat transmission or storage medium in addition to the primary purpose of providing a combustion mixture for the aircraft engines. When used as a working fluid in various systems heat exchangers, the fuel is often heated and requires compensating heat exchange for dissipating thermal energy to maintain desired temperatures. This issue can be exacerbated by thermally insulated composite wing fuel tanks in modern aircraft designs.

It is therefore desirable to provide passive heat exchange for aircraft fuel in the fuel tanks of the aircraft.

SUMMARY

The exemplary implementations disclosed herein provide an access panel to be received in an access aperture in a lower skin of a wing on an aircraft. The access panel incorporates a body surrounded by a sealing flange. The body is configured to be received in the access aperture and the sealing flange is configured to be received on a sealing land surrounding the access aperture. An integral heat exchanger extends from a top surface of the body into a fuel tank in the wing to conduct heat from the fuel to an external surface of the access panel.

The exemplary implementations provide a method for heat removal from fuel in an aircraft wing fuel tank. Cooling fins are extended from an access panel body to provide an integral heat exchanger. The access panel is inserted in an access aperture in a wing skin with the cooling fins extending into the wing fuel tank. A sealing flange of the access panel is engaged with a sealing land in the wing skin. The cooling fins are electrically isolated from the wing skin with an insulating layer in the body. Heat is then conducted from the fuel in the wing tank to an external surface of the access panel.

BRIEF DESCRIPTION OF THE DRAWINGS

The features, functions, and advantages that have been discussed can be achieved independently in various implementations or may be combined in yet other implementations further details of which can be seen with reference to the following description and drawings.

DETAILED DESCRIPTION

The implementations described herein provide a convective and conductive heat exchanger integrated in one or more fuel tank maintenance access panels to allow an exit path for excess thermal energy in the fuel tank.

Figure 1A:
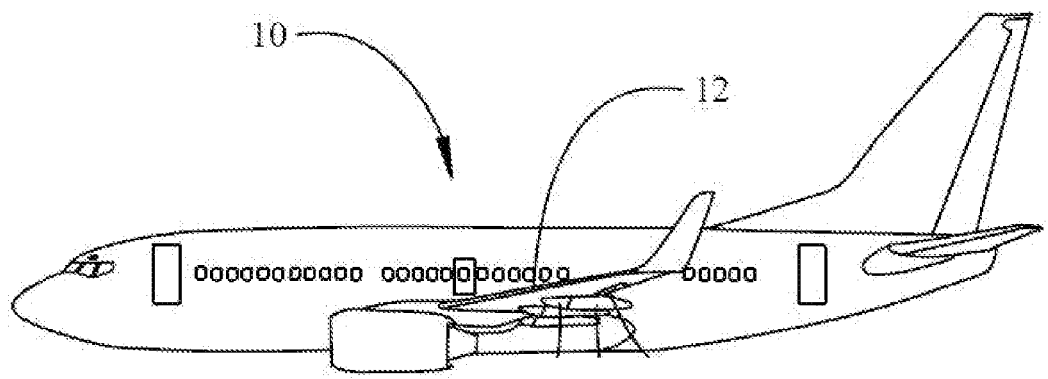
FIG. 1A is a representation of an aircraft in which the implementations disclosed herein may be employed.
Figure 1B:
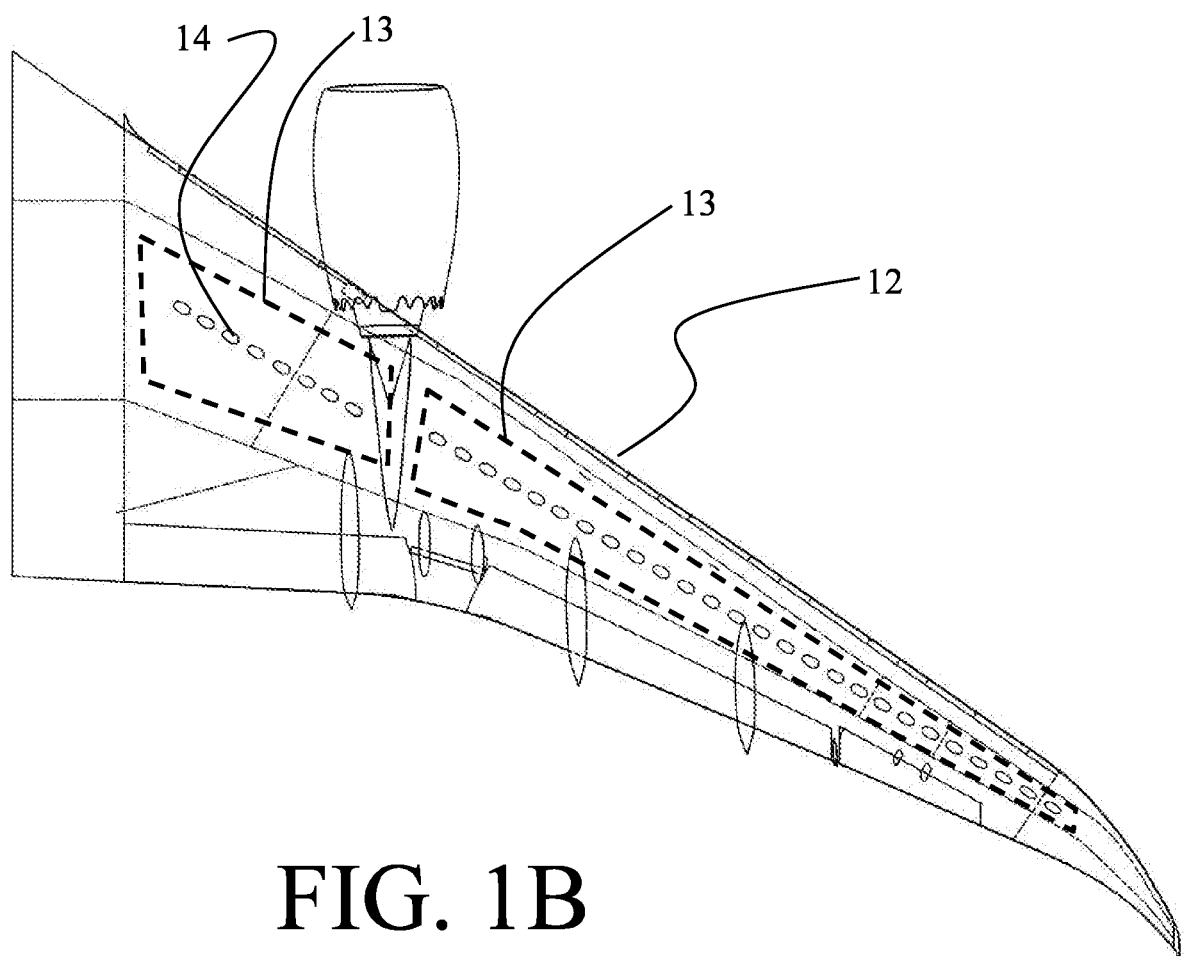
FIG. 1B is a top view of the wing of the aircraft of FIG. 1A.

Referring to the drawings, FIGS. 1A and 1B depict an aircraft 10 having a wing 12. The wing 12 incorporates integral fuel tanks 13 which have a plurality of access panels 14. The access panels 14 are removable for access to the interior of the associated fuel tanks during initial manufacture and assembly of the aircraft 10 as well as subsequent maintenance activities.

Figure 2A:
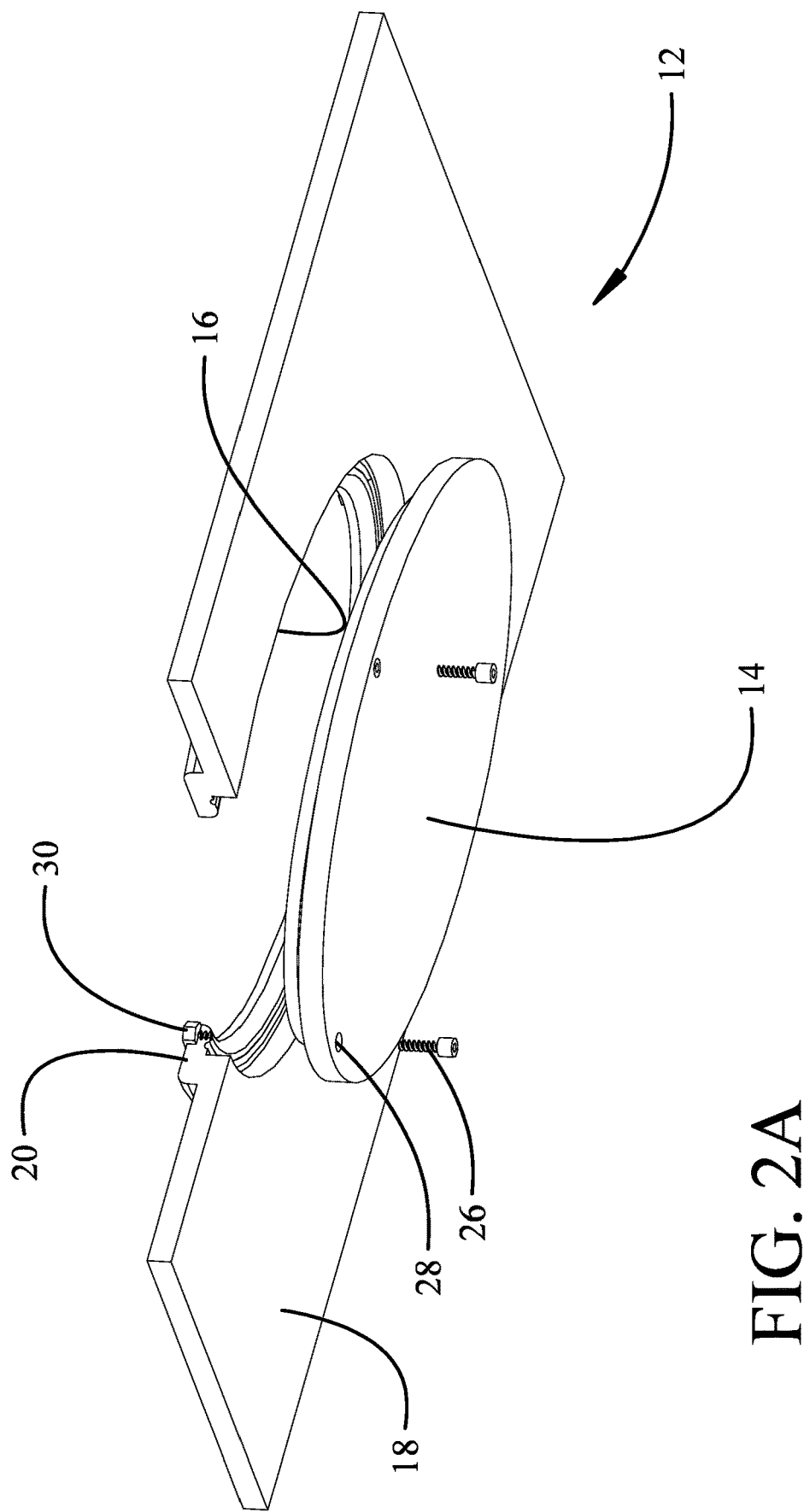
FIG. 2A is an upward partially sectioned pictorial representation from under the wing of an access panel with which the present implementations may be employed.
Figure 2B:
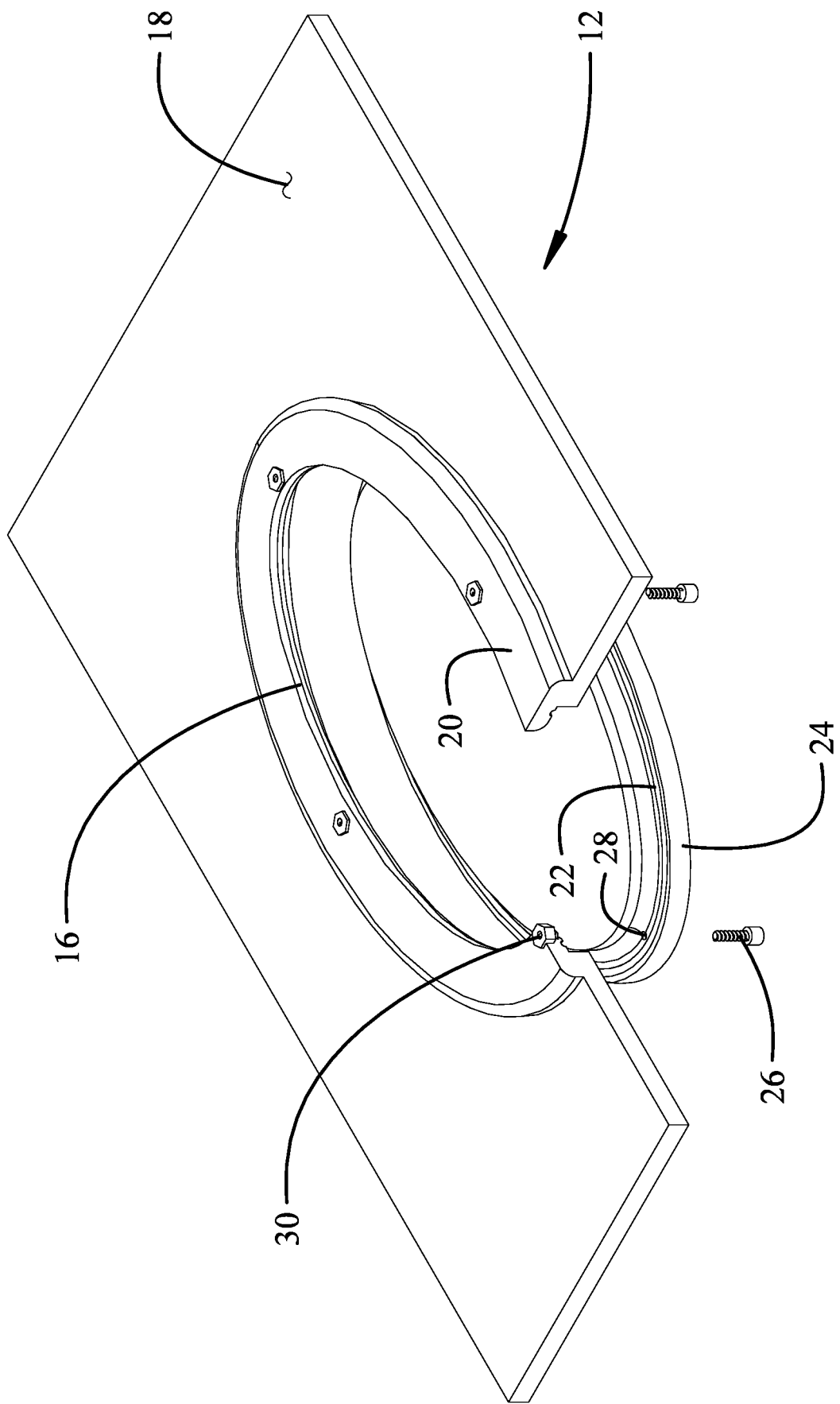
FIG. 2B is a downward partially sectioned pictorial representation from inside the wing of the access panel of FIG. 2A.
Figure 3A:
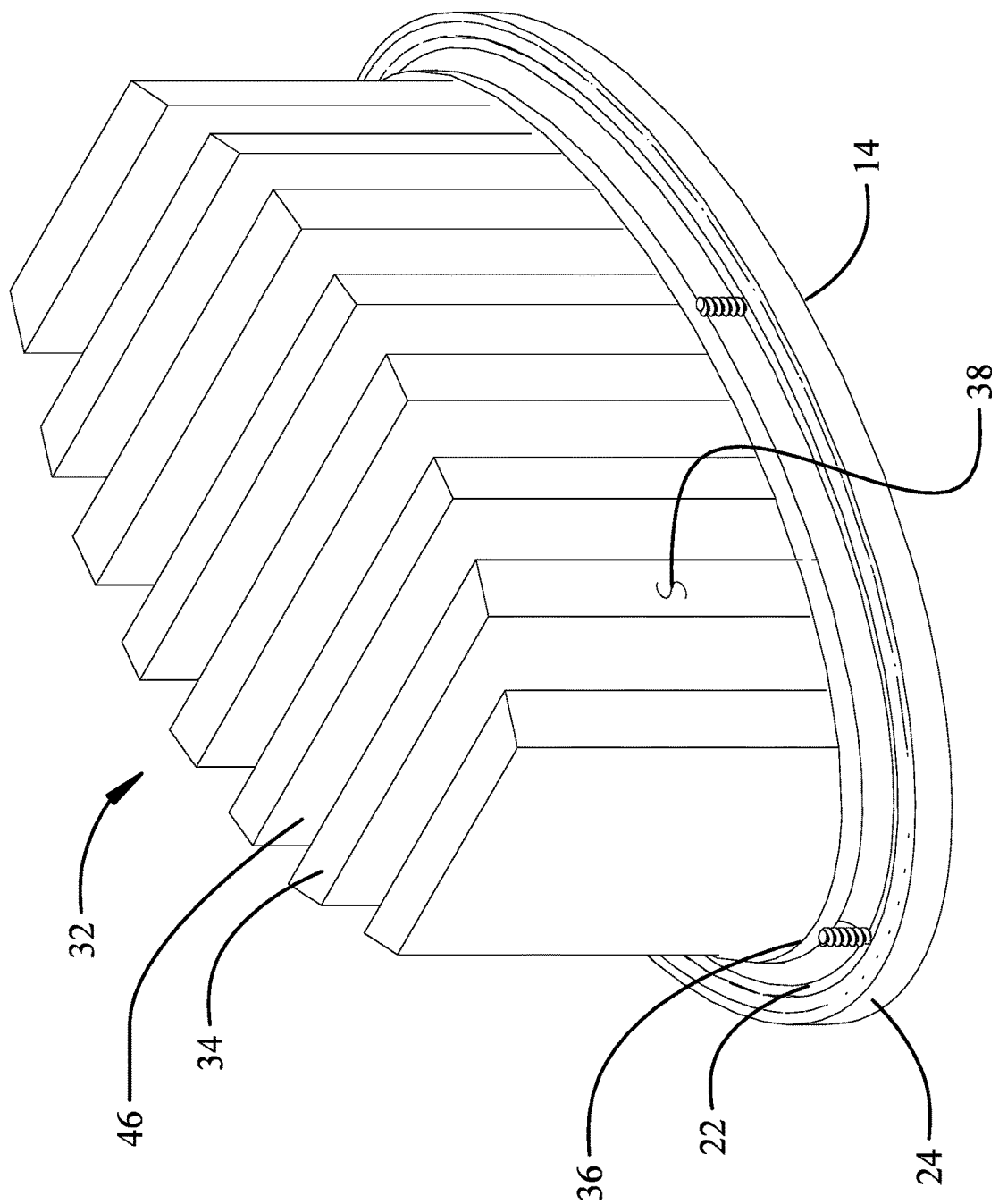
FIG. 3A is a upper pictorial representation of a first implementation of an access panel with an integral heat exchanger.
Figure 3B:
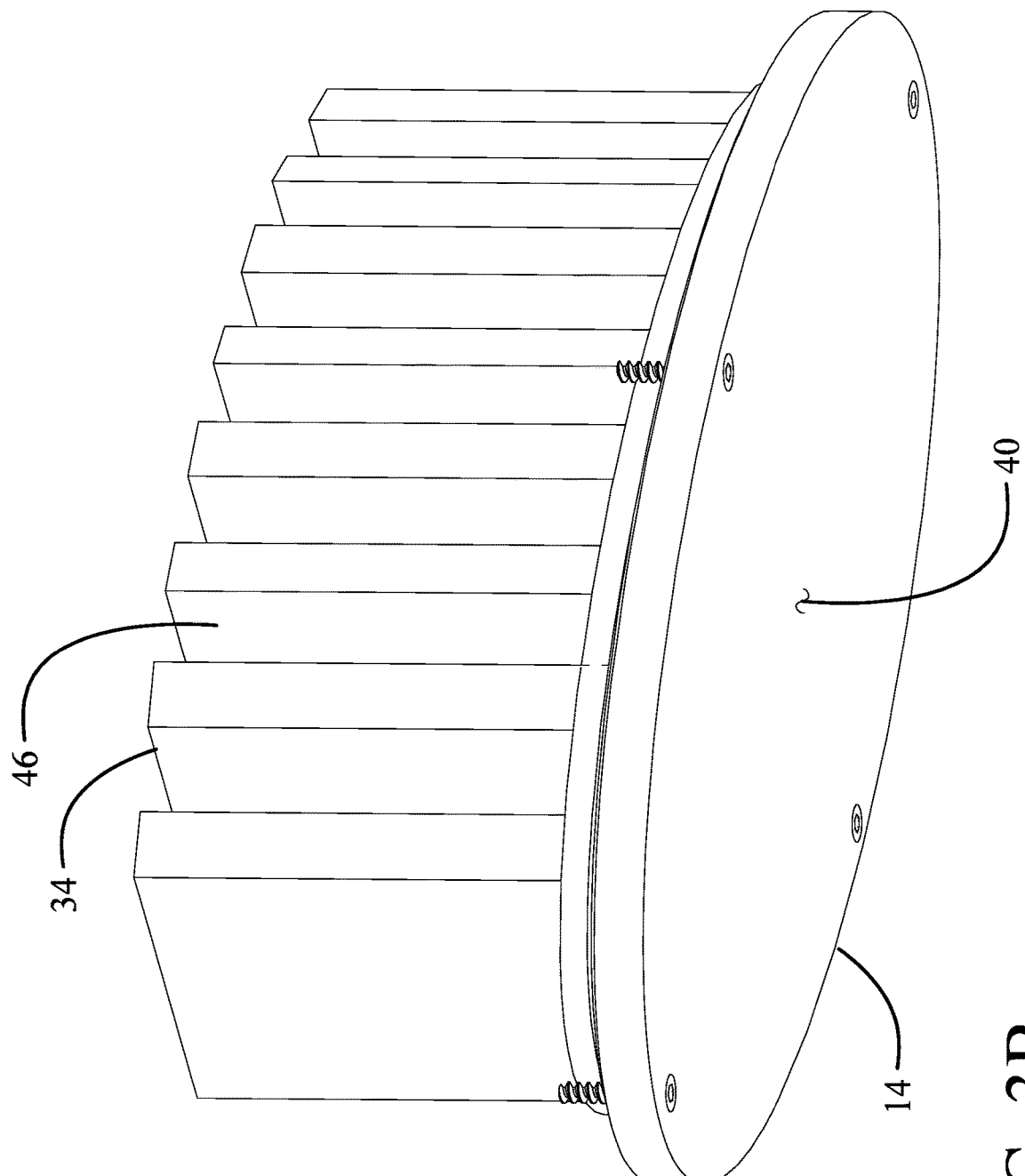
FIG. 3B is a lower pictorial representation of the first implementation.
Figure 4A:
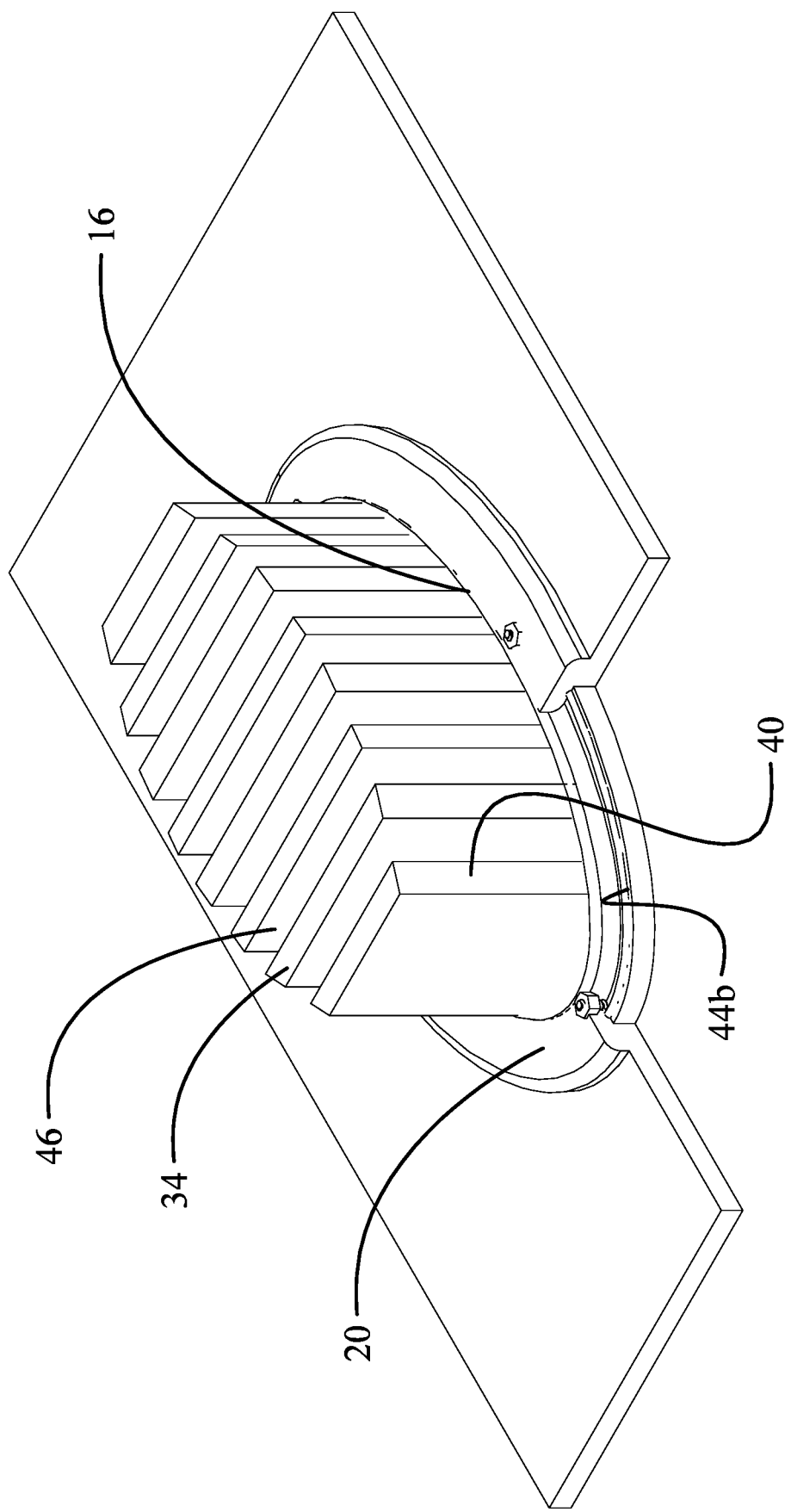
FIG. 4A is a partially sectioned upper pictorial representation of the first implementation as inserted in the lower wing skin aperture.
Figure 4B:
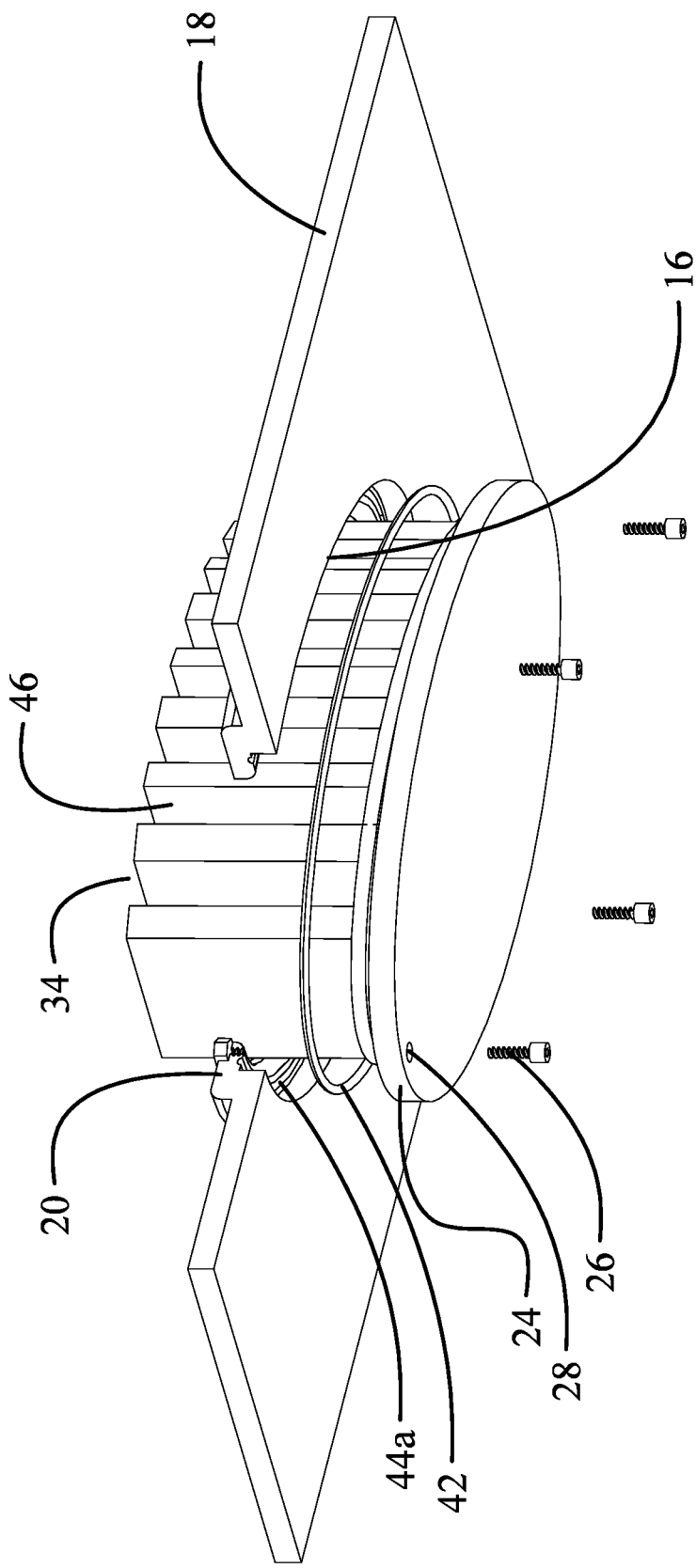
FIG. 4B is a partially sectioned lower exploded pictorial representation of the first implementation with respect to the lower wing skin aperture.

As seen in FIGS. 2A and 2B, an example access panel 14 is configured to be received in an access aperture 16 having a mating oval shape in a lower skin 18 of the wing 12. For the implementation shown, the panel is engaged through the lower skin 18 from the exterior of the wing on a sealing land 20 internal to the lower skin 18 surrounding the oval access aperture 16. A sealing flange 22 on a peripheral edge 24 of the access panel 14 engages the sealing land 20 with appropriate gaskets or other sealing elements such as molded rubber seals (not shown) to prevent leakage. Thicknesses of the elements shown in the drawings are exaggerated for clarity of the features. In alternative configurations, the access panel is engaged to the lower skin 18 from the interior of the tank. A plurality of fasteners 26 (four exemplary fasteners shown) inserted through holes 28 in the peripheral edge 24 are received in nut plates 30 or similar mating elements to secure the access panel 14 to the sealing land 20. In the alternative configuration a clamp ring and gasket may be engaged on the exterior surface of the wing skin with the fasteners extending through the clamp ring and sealing flange interior to the wing skin.

A first implementation of a heat exchanger 32 integrated on an access panel 14 is shown in FIGS. 3A, 3B, 4A and 4B. A plurality of upstanding fins or columns, referred to herein generally as cooling fins 34 extend from a top surface 36 of the access panel 14 through the access aperture 16. Surfaces 38 of the cooling fins 34 provide additional surface area to increase heat flux into the access panel 14 from fuel carried within the tank. The external surface 40 of the access panel 14 may then emit the heat flux through radiation or convection into the external environment. A thermally conductive resilient seal ring 42, best seen in FIG. 4B, constrained in mating grooves 44a and 44b in the sealing land 20 and sealing flange 22, respectively, may be employed to assist in conductive heat transfer from the access panel 14 to the surrounding lower wing skin 18. The thermally conductive resilient seal ring 42 may replace or be employed in addition to fluid sealing rings or gaskets. A plurality of channels 46 separate the cooling fins 34.

Cross sectional area or representative thickness, t, height, h, and spacing, s, of the cooling fins 34 as well as orientation of the channels 46 relative to the major and minor axes 48a, 4b of the elliptical shape of the access panel may be varied in differing implementations or in various locations of the plurality of access panels 14 in the wing lower skin 18 as seen in FIGS. 5A-5D. Thickness t will vary depending upon the height and fuel load, ideally 0.1" or less to maximize the heat transfer but may be significantly thicker due to structural considerations. Height h will vary with location in the tank from 12"-18" proximate the root of the wing 12 down to 1-2" proximate the tip of the wing 12. Holes 57 may be present in the cooling fins 34 as shown the implementation in FIG. 5D to provide reduced fuel sloshing. Spacing s will likely be substantially equivalent to the thickness t but may vary depending on thermal requirements. Width of the cooling fins will vary with the size of the access aperture 16 and orientation of the cooling fins 34. Dimensions of the cooling fins 34 and channels 46 are exaggerated in the drawings for clarity.

Figure 5A:
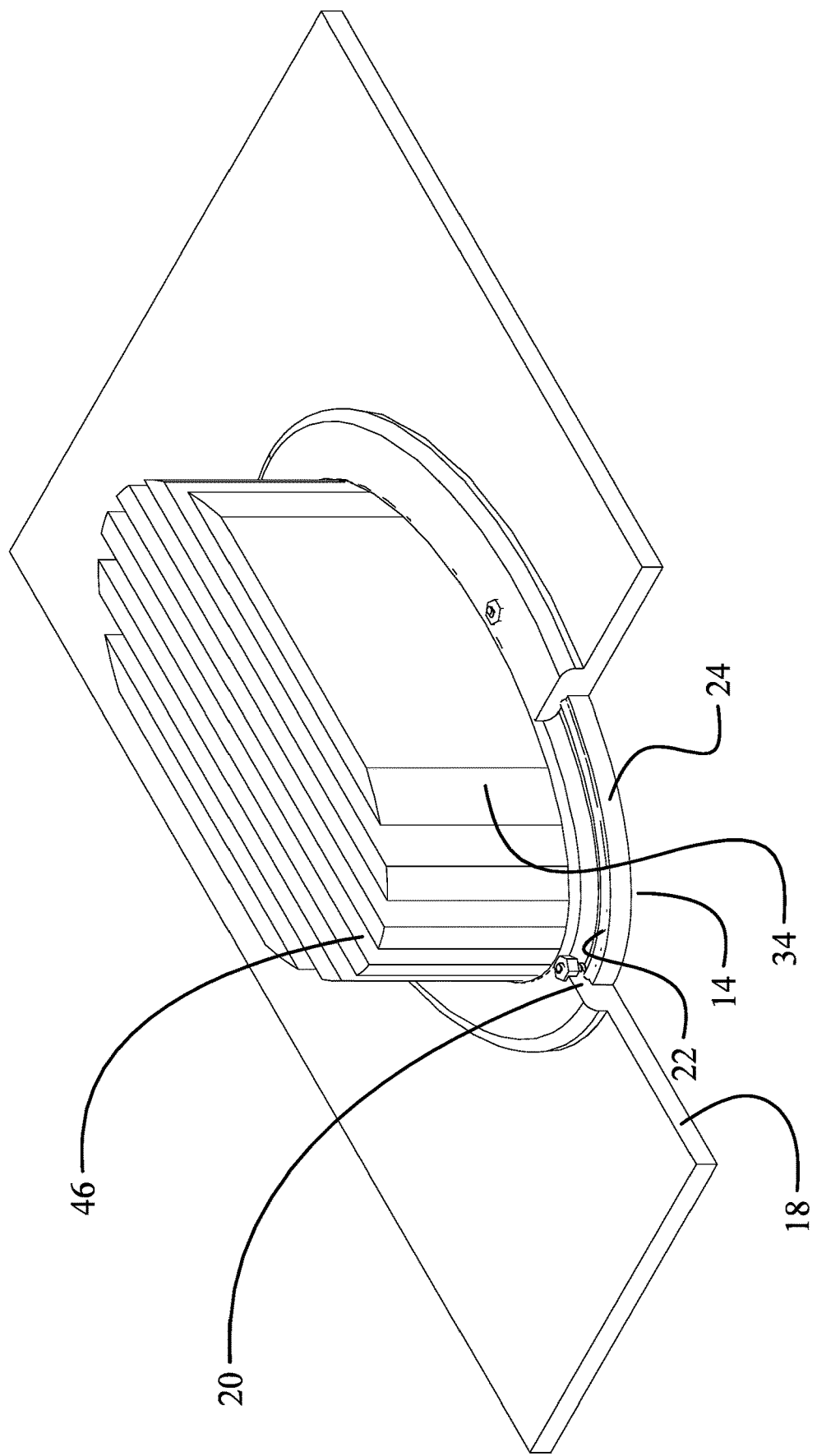
FIG. 5A is a partially sectioned upper pictorial representation of a second implementation of the access panel with an integral heat exchanger as inserted in the lower wing skin aperture.
Figure 5B:
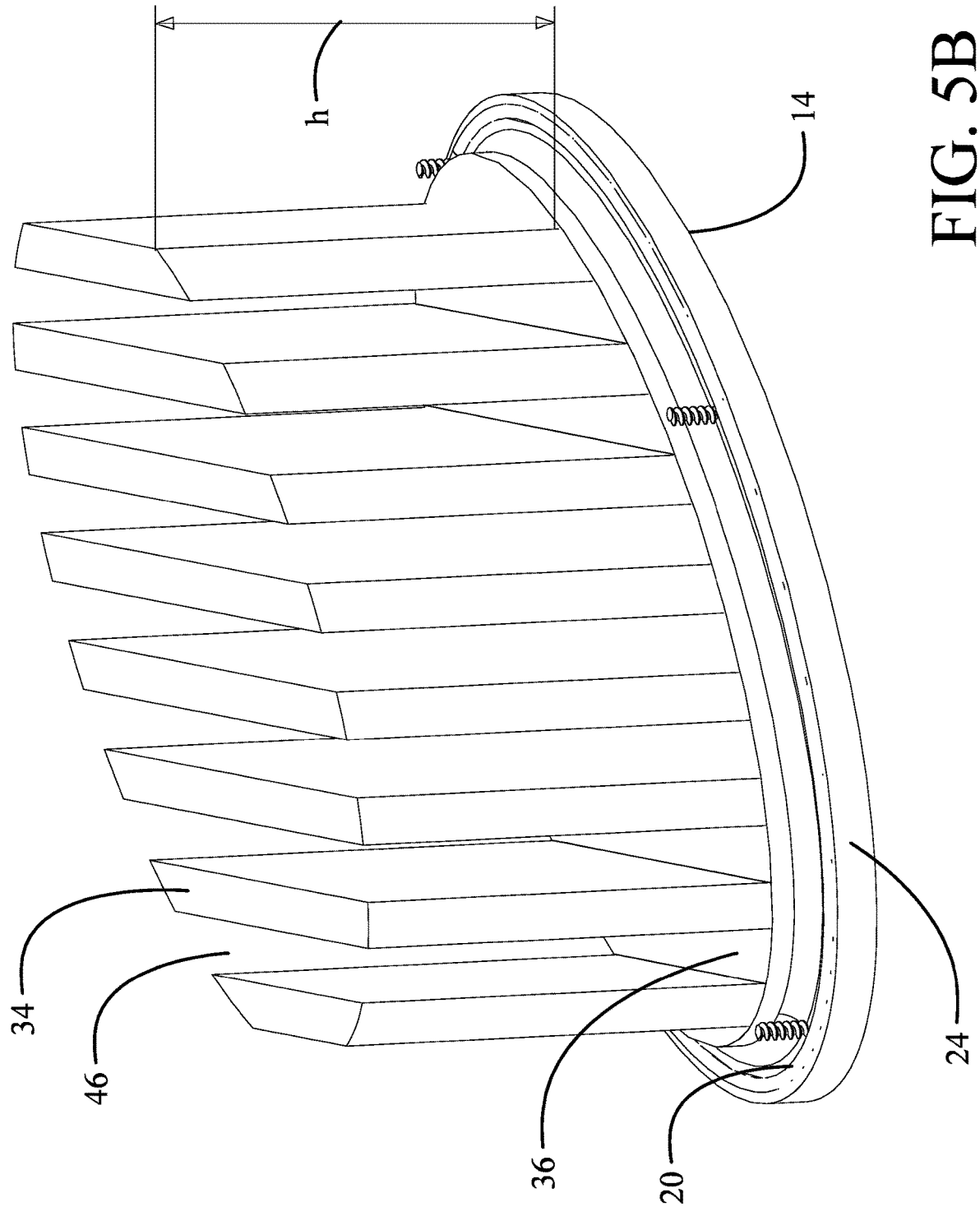
FIG. 5B is a upper pictorial representation of a third implementation of the access panel with an integral heat exchanger.
Figure 5C:
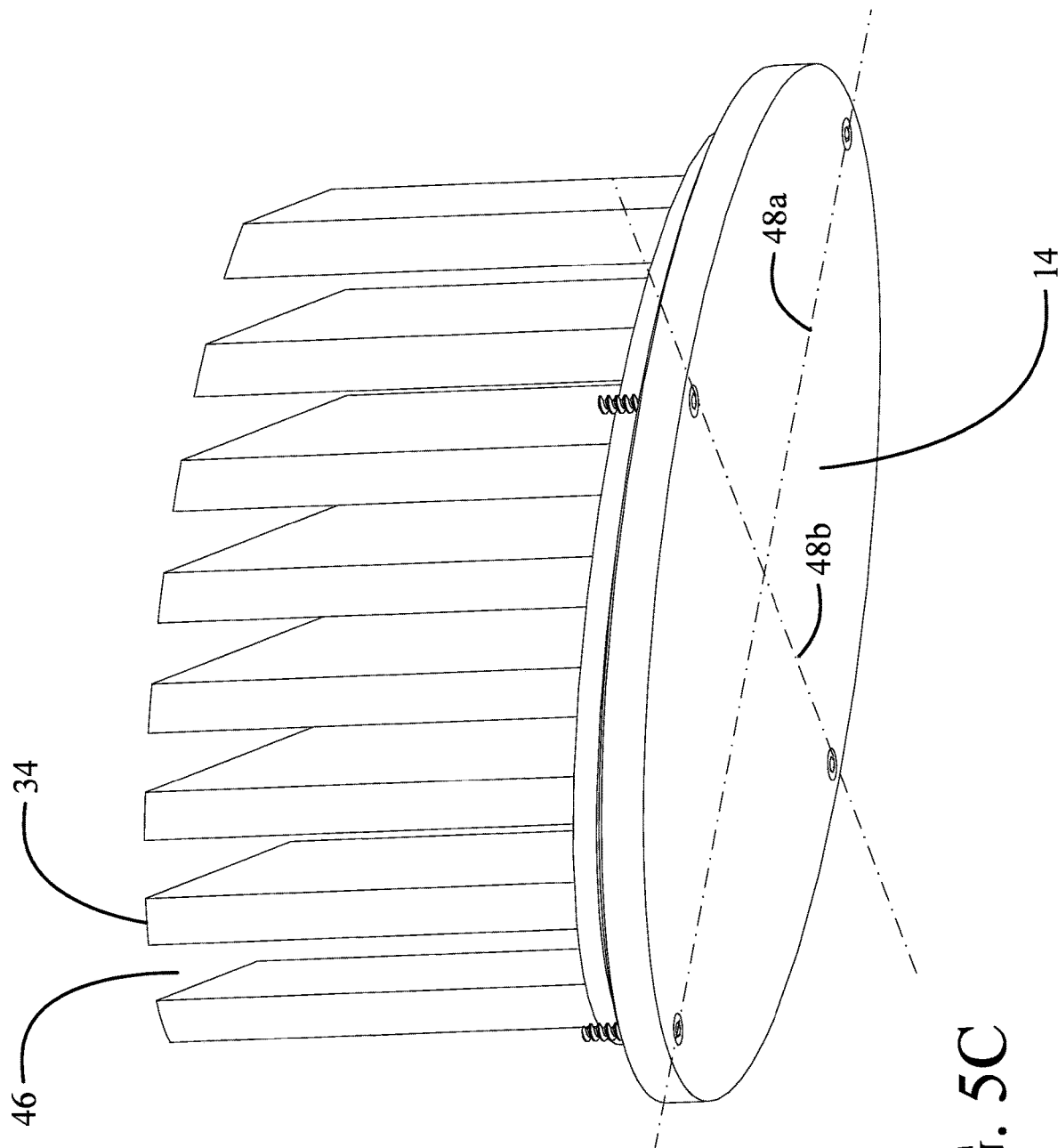
FIG. 5C is a lower pictorial representation of the third implementation.
Figure 5D:
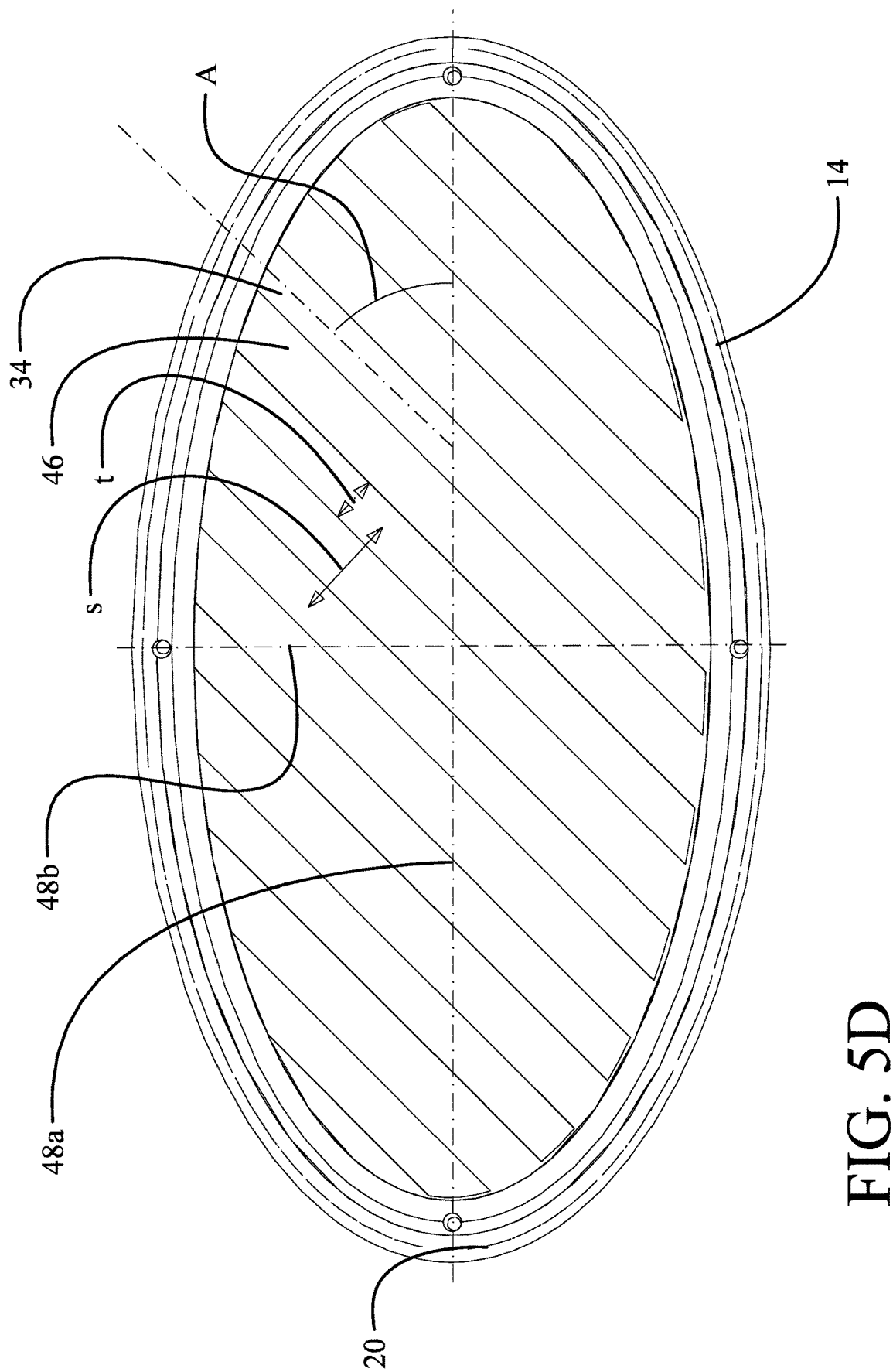
FIG. 5D is a top view of the third implementation.
Figure 5E:
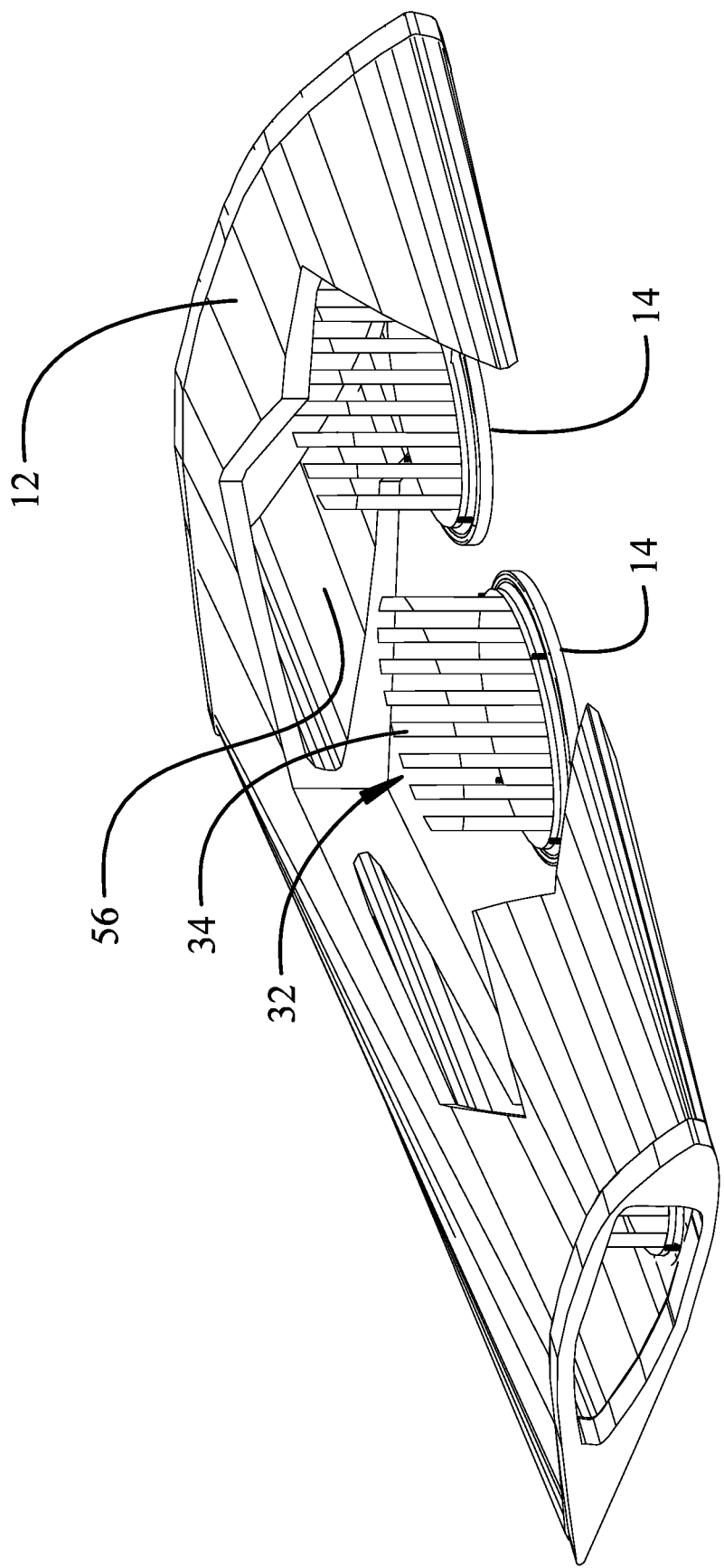
FIGS. 5E-5G are cutaway pictorial representations, a top cutaway view and a front cutaway view of the wing showing multiple cooling fin heights in the heat exchanger for the varying chord depth.
Figure 5F:
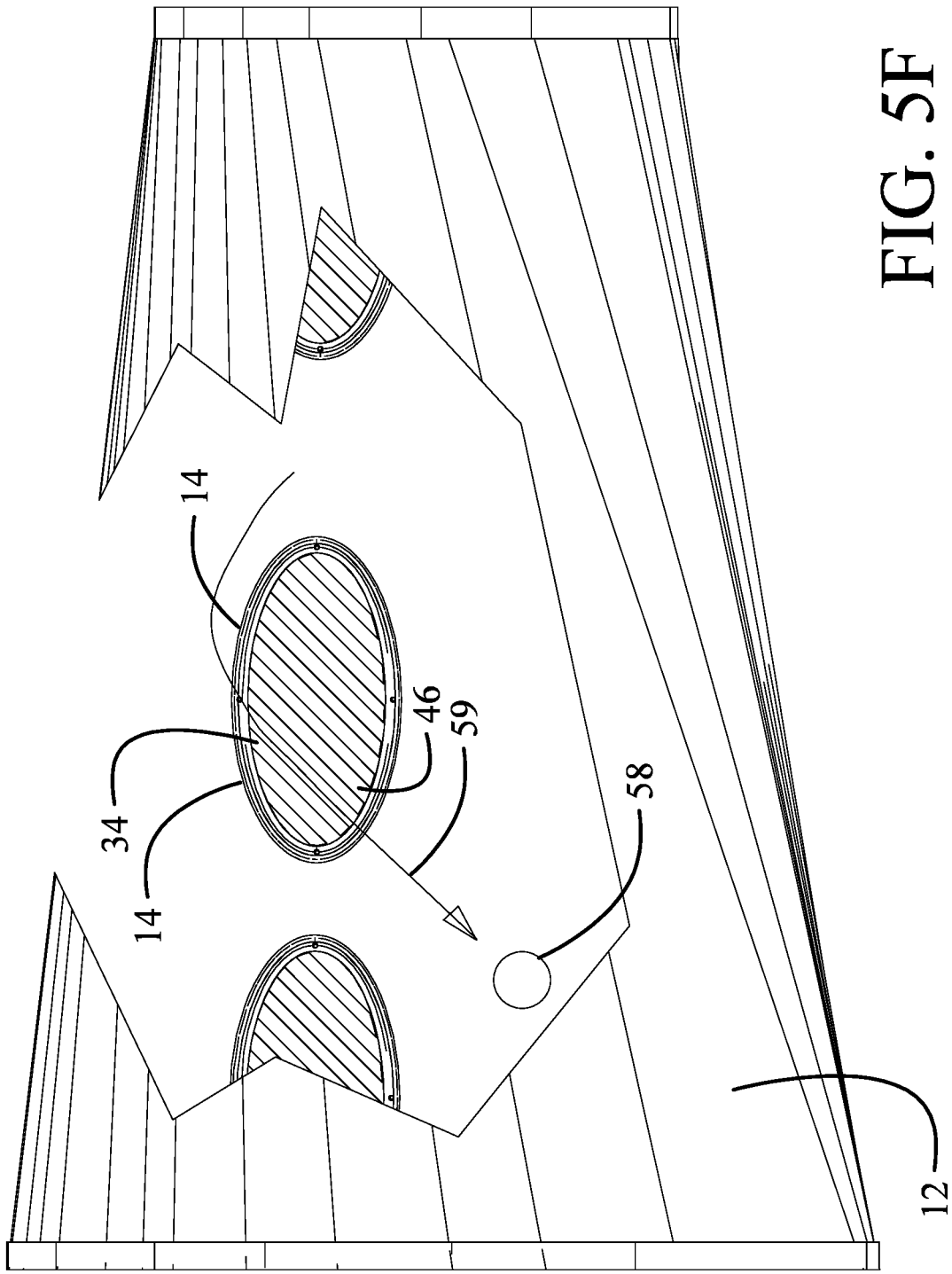
Figure 5G:
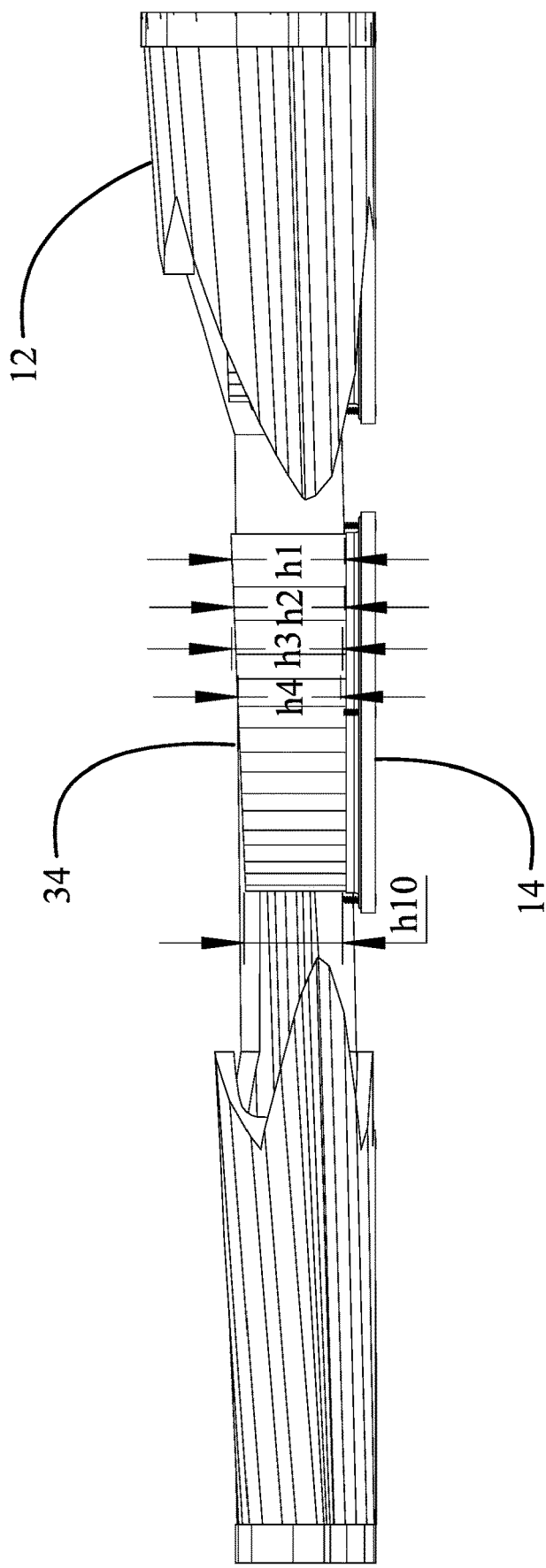

The cooling fins 34 extend into an integral fuel tank 56 in the wing 12 as shown in FIG. 5E. An orientation angle, A, of the cooling fins 34 and channels 46 (seen in FIG. 5D) may be determined based on predetermined flow patterns of fuel within the tank due to recirculation or pumping of the fuel during normal operation of the aircraft to create enhanced flow of the fuel and minimize loads associated with flow of the fuel through the channels 46. Flow to a sump 58 as represented by arrow 59 in FIG. 5F would be an example The heights, h1-h10, of the cooling fins 34 can vary with the wing thickness and tank depth as a function of the span-wise location on the wing (as seen in FIG. 5G spanwise chord variation exaggerated for clarity).

Figure 6:
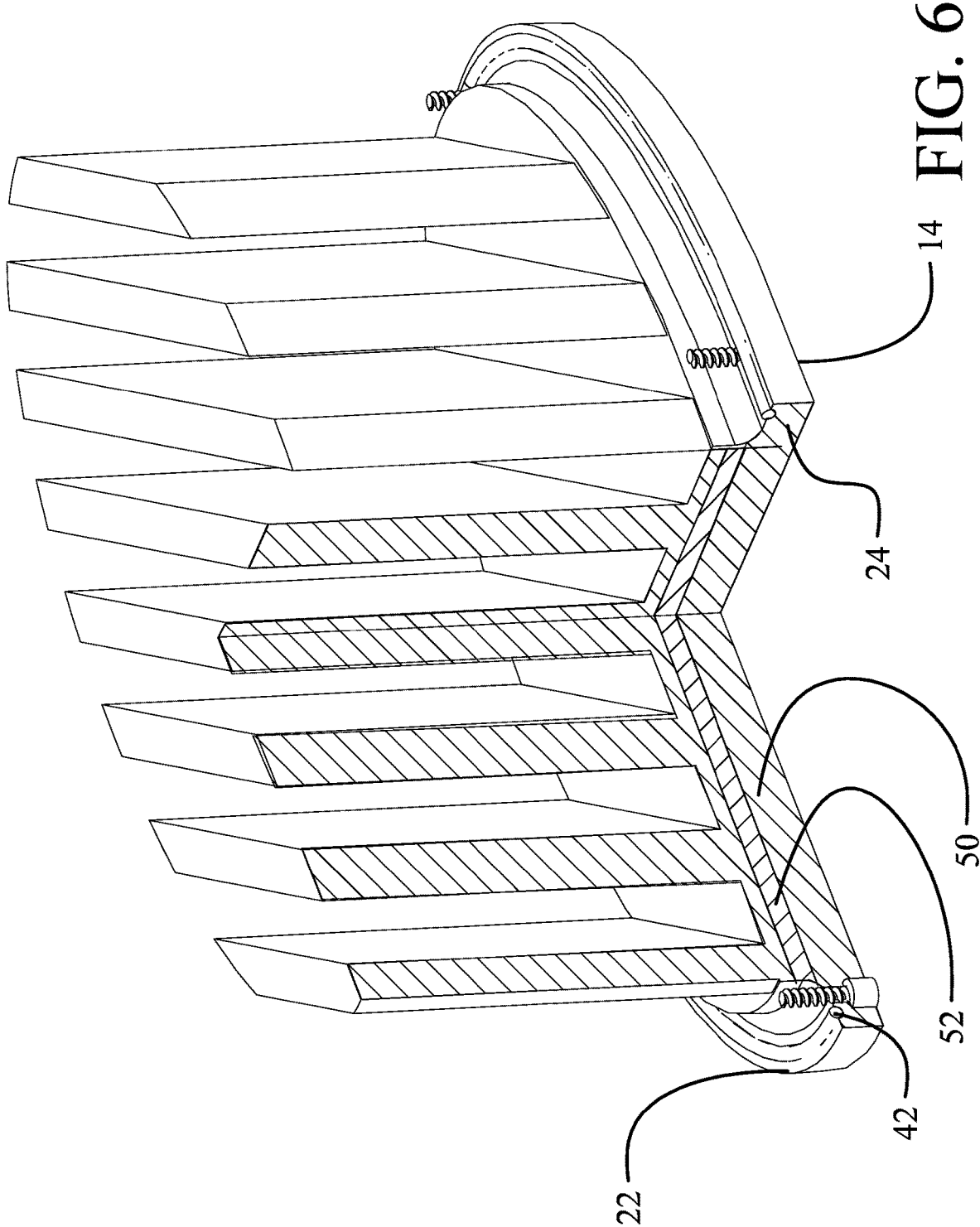
FIG. 6 is a partially sectioned upper pictorial representation of the third implementation of the access panel with an integral heat exchanger and a laminated dielectric layer for electrical isolation.

While the channels 46 are shown as unidirectional in the example, alternative implementations may employ channels in multiple directions through the cooling fins. The surface roughness and or smaller external cooling fins on the access panel 14 can allow for additional heat transfer into the free stream As seen in FIG. 6, the access panel 14 may include a body 50, surrounded by the sealing flange 22 and terminating in the top surface 36, from which the cooling fins 34 extend. The panel 14 and body 50 may be laminated with multiple material layers for enhanced thermal conductivity and may include a laminated dielectric layer 52 to electrically isolate the body 50 or panel 14 for example in implementation in conjunction with carbon fiber composite wing lower skins 18 where electrical conductivity in the skin is desirable but isolation from the fuel tank interior is necessary. In example implementations, the dielectric layer 52 is a resin or epoxy layer with embedded boron particles 54 or a layer of silicon carbide to provide the desired electrical isolation while providing desired thermal conduction.

Figure 7:
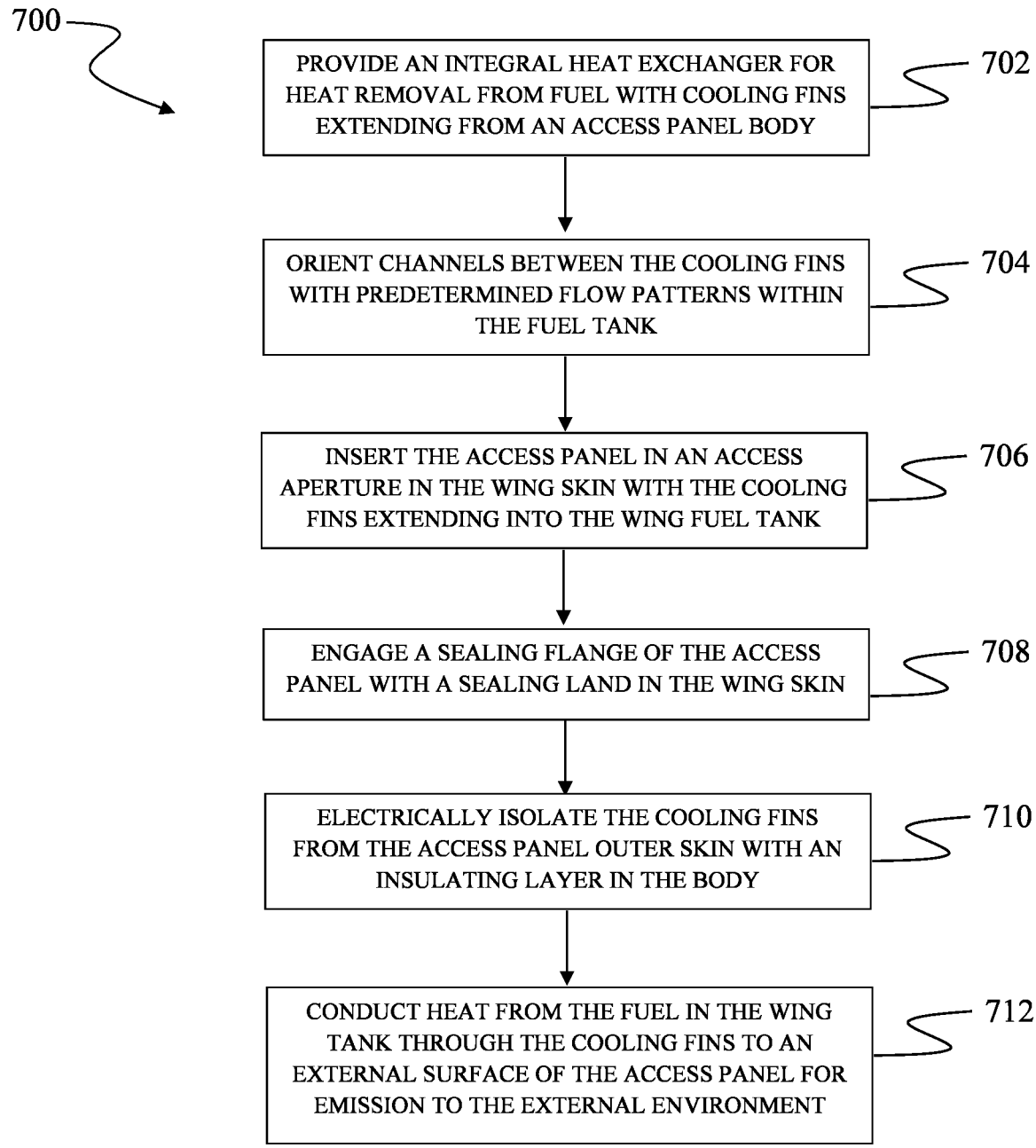
FIG. 7 is a flow chart of a method for removing heat from a wing fuel tank as disclosed.

The implementations described provide a method 700 for heat removal from fuel in an aircraft wing tank as shown in FIG. 7. Cooling fins extending from an access panel body provide an integral heat exchanger, step 702. Channels between the cooling fins are oriented consistent with predetermined flow patterns within a fuel tank, step 704. The access panel is inserted in an access aperture in a wing skin with the cooling fins extending into the wing fuel tank, step 706. A sealing flange of the access panel is engaged with a sealing land in the wing skin, step 708. The cooling fins are electrically isolated from the access panel outer skin with an insulating layer in the body, step 710. Heat from fuel in the wing tank is then conducted by the cooling fins to an external surface of the access panel for emission to the external environment, step 712.

Figure 8:
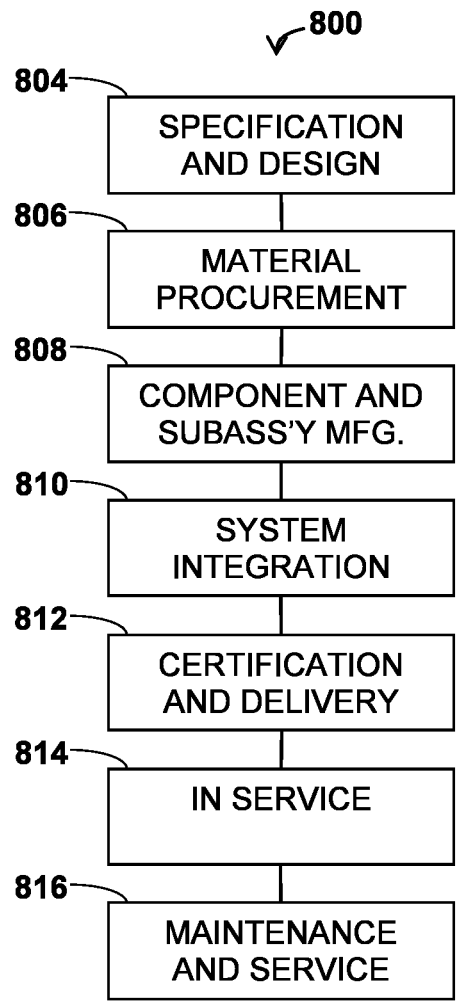
FIG. 8 is a flow diagram of aircraft production and service methodology.
Figure 9:
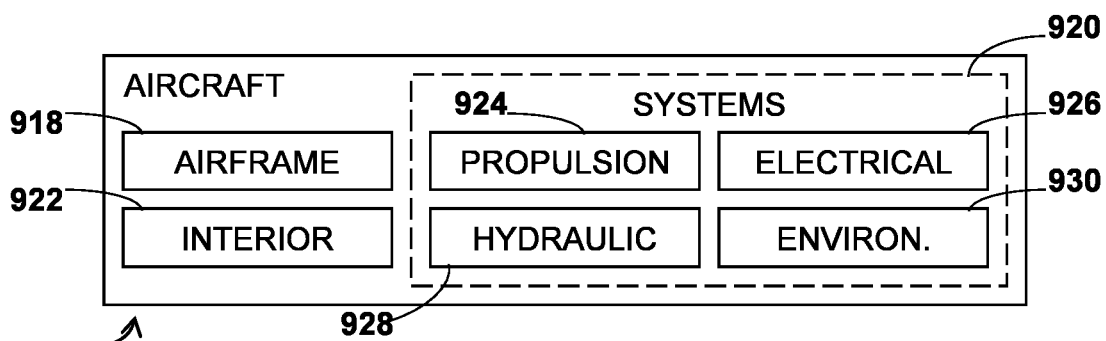
FIG. 9 is a block diagram representation of the aircraft.

The implementations herein additional are applicable to described in the context of an aircraft manufacturing and service method 800 as shown in FIG. 8 and an aircraft 10 as shown in FIG. 1A and represented schematically in FIG. 9. During pre-production, exemplary method 800 may include specification and design 804 of the aircraft 10 and material procurement 806. During production, component and subassembly manufacturing 808 and system integration 810 of the aircraft 10 takes place. Thereafter, the aircraft 10 may go through certification and delivery 812 in order to be placed in service 814. While in service by a customer, the aircraft 10 is scheduled for routine maintenance and service 816 (which may also include modification, reconfiguration, refurbishment, and so on). The access panels 14 with integrated heat exchangers 32 as disclosed herein may be provided as replacement components or maintenance replaceable units (MRUs (units which provide improved functionality over original equipment (OE) but have interchangeable dimensioning) during such maintenance and service.

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 10 produced by exemplary method 800 may include an airframe 918, having wing skins 18 as disclosed herein, with a plurality of systems 920 and an interior 922. Examples of high-level systems 920 include one or more of a propulsion system 924 including the fuel tanks 13 disclosed herein, an electrical system 926, a hydraulic system 928, and an environmental system 930. Any number of other systems may be included. Although an aerospace example is shown, the principles of the invention may be applied to other industries, such as the automotive industry.

Apparatus and methods disclosed herein may be employed during any one or more of the stages of the production and service method 800. For example, components or subassemblies corresponding to subassembly manufacturing 808 may be fabricated or manufactured in a manner similar to components or subassemblies produced while the aircraft 10 is in service. Also, one or more aspects of the apparatus, method, or a combination thereof may be utilized during subassembly manufacturing 808 and system integration 810, for example, by substantially expediting assembly of or reducing the cost of an aircraft 10. Similarly, one or more of apparatus embodiments, method embodiments, or a combination thereof may be utilized while the aircraft 10 is in service, for example and without limitation, to maintenance and service 816.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide. As used herein the terms "upper", "lower", "outboard" and "inboard" and "aft" and "forward" may be employed to describe relative positioning and other than for the specific implementations disclosed may be substituted with appropriate descriptors such as "first" and "second", "top" and "bottom" or "right" and "left" depending on orientation of actual implementation.

What is claimed is:

1. A fuel tank comprising:
    a lower skin having an access aperture and a sealing land extended from an internal surface of the lower skin into the fuel tank and surrounding the access aperture; and
    an access panel configured to be received in the access aperture from an exterior of the tank with a top surface of the access panel interior to the tank, the access panel having a sealing flange engaging the sealing land and an integral heat exchanger extending into the tank from the top surface; and
    a plurality of fasteners extending through the sealing flange into the sealing land.

2. The fuel tank as defined in claim 1 wherein the integral heat exchanger comprises a plurality of cooling fins separated by a plurality of channels.

3. The fuel tank as defined in claim 2 wherein the plurality of channels are oriented at an angle consistent with fuel flow patterns within the fuel tank.

4. The fuel tank as defined in claim 3 wherein the plurality of cooling fins extend from a body of the access panel surrounded by the sealing flange.

5. The fuel tank as defined in claim 4 wherein the access panel is laminated and includes a dielectric layer configured to electrically isolate the plurality of cooling fins from the lower skin.

6. The fuel tank as defined in claim 5 wherein the dielectric layer is thermally conductive.

7. The fuel tank as defined in claim 6 wherein the dielectric layer incorporates a resin layer with embedded boron particles.

8. The fuel tank as defined in claim 4 further comprising a thermally conductive resilient seal ring constrained in mating grooves in the sealing land and the sealing flange.

9. The fuel tank as defined in claim 1 wherein the access panel is a maintenance replaceable unit (MRU).

10. An access panel to be received in an access aperture in an integral fuel tank, the access aperture in a lower skin of a wing on an aircraft, the access panel comprising:
    a body surrounded by a sealing flange, said body configured to be received in the access aperture from an exterior of the integral fuel tank and said sealing flange configured to be received on a sealing land extended from an internal surface of the lower skin into the integral fuel tank, a plurality of fasteners extending through the sealing flange into the sealing land; and
    an integral heat exchanger extending from an upper surface of the body into the integral fuel tank in the wing.

11. The access panel as defined in claim 10 wherein the integral heat exchanger comprises a plurality of cooling fins separated by a plurality of channels.

12. The access panel as defined in claim 11 wherein the plurality of channels are oriented at an angle consistent with fuel flow patterns within the fuel tank.

13. The access panel as defined in claim 12 wherein the access panel is laminated and includes a dielectric layer configured to electrically isolate the plurality of cooling fins from the lower skin.

14. The fuel tank as defined in claim 13 wherein the dielectric layer is thermally conductive.

15. The fuel tank as defined in claim 14 wherein the dielectric layer comprises a resin layer with embedded boron particles.

16. The fuel tank as defined in claim 15 further comprising a thermally conductive resilient seal ring constrained in mating grooves in the sealing land and the sealing flange.

17. An aircraft comprising:
    a wing having an integral fuel tank with a lower skin having an access aperture and a sealing land extending into the integral fuel tank from an internal surface of the lower skin surrounding the access aperture;
    an access panel with a top surface interior to the integral fuel tank and having
        a body extending from the top surface surrounded by a sealing flange, said body configured to be received in the access aperture from an exterior of the integral fuel tank with the sealing flange engaging the sealing land;
        a plurality of cooling fins extending from the body into the integral fuel tank, said plurality of cooling fins separate by a plurality of channels, wherein the plurality of channels are oriented at an angle consistent with fuel flow patterns within the fuel tank and wherein the access panel is laminated and includes a dielectric layer configured to electrically isolate the plurality of cooling fins from the lower skin and the dielectric layer is thermally conductive;
    a thermally conductive resilient seal ring constrained in mating grooves in the sealing land and the sealing flange; and
    a plurality of fasteners extending through the sealing flange into the sealing land.

18. A method for heat removal from fuel in an aircraft wing fuel tank, the method comprising:
    extending cooling fins from a body on a top surface of an access panel to provide an integral heat exchanger;

inserting the access panel from an exterior of the aircraft wing fuel tank in an access aperture in a wing skin with the top surface on the interior of the fuel tank with the cooling fins extending into the fuel tank;

engaging a sealing flange of the access panel with a sealing land extending into the interior of the fuel tank from an internal surface of the lower wing skin surrounding the access aperture;

extending a plurality of fasteners through the sealing flange into the sealing land;

electrically isolating the cooling fins from the wing skin with an insulating layer in the body; and, conducting heat from fuel in the fuel tank to an external surface of the access panel.

19. The method as defined in claim 18 further comprising orienting channels between the cooling fins consistent with flow patterns within the wing tank.

\* \* \* \* \*